United States Patent [19]
Kirschenbaum et al.

[11] Patent Number: 5,968,112
[45] Date of Patent: Oct. 19, 1999

[54] SIGNAL PROCESSOR AND METHOD FOR FOURIER TRANSFORMATION

[75] Inventors: Jacob Kirschenbaum, Hadera; Itzhak Barak, Tel Aviv; Yaron Ben-Arie, Ramat Gan; Yacov Efrat, Omer; Effi Orian, Pardessia, all of Israel; Shao Wei Pan, Lake Zurich; Shay Ping Wang, Long Grove, both of Ill.

[73] Assignee: Motorola, Inc., Schaumburg, Ill.

[21] Appl. No.: 08/923,845

[22] Filed: Sep. 4, 1997

[51] Int. Cl.[6] .................................................... G06F 17/14
[52] U.S. Cl. ............................................................ 708/405
[58] Field of Search .................... 364/725.01–726.07; 708/400–409

[56] References Cited

U.S. PATENT DOCUMENTS

| | | | |
|---|---|---|---|
| 4,293,921 | 10/1981 | Smith, Jr. ............................ | 364/726.03 |
| 4,563,750 | 1/1986 | Clarke ................................. | 364/726.02 |
| 5,109,356 | 4/1992 | Lawton ............................... | 364/726.03 |
| 5,751,616 | 5/1998 | Hegland et al. ..................... | 364/725.02 |

*Primary Examiner*—Tan V. Mai
*Attorney, Agent, or Firm*—James E. Gauger

[57] ABSTRACT

Parallel signal processor (10) (FIG. 2) performs a Fourier Transformation of an input signal; The transformation coefficients are converted once to logarithmic form and stored in a cache memory. The input data is converted serially to logarithmic form, and fed to all processing units in parallel. The processing units compute their respective products as additions in the logarithmic domain. Then, the products are converted back to the normal domain. The products with the correct sign are summed by an accumulator of the respective processing element. After the last signal data point has run through the processing elements and the last products are added to their respective sums, all complex output signal data points are complete simultaneously.

25 Claims, 2 Drawing Sheets

| Accumulator | 30 | | 30 | |
|---|---|---|---|---|
| (Normal Domain) | $Re(x_i * W_M^{mq} * W_N^{lq})$ | | $Im(x_i * W_M^{mq} * W_N^{lq})$ | |
| | | | | |
| Computing Elements | 24 | 24 | 24 | 24 |
| Cache Memory | 26 | 26 | 26 | 26 |
| (Log Domain) | $Re(\log W_M^{mq})$ | $-Im(\log W_M^{mq})$ | $Im(\log W_M^{mq})$ | $Re(\log W_M^{mq})$ |
| | | | | |
| (Log Domain) | $Re(\log W_N^{lq})$ | $Im(\log W_N^{lq})$ | $Re(\log W_N^{lq})$ | $Im(\log W_N^{lq})$ |
| | | | | |
| Signal Value | $\log x_i$ | $\log x_i$ | $\log x_i$ | $\log x_i$ |

FIG. 3

| Accumulator | 30 | | 30 | |
|---|---|---|---|---|
| (Normal Domain) | $Re(x_i * W_M^{mq} * W_N^{lq})$ | | $Im(x_i * W_M^{mq} * W_N^{lq})$ | |
| | | | | |
| Computing Elements | 24 | 24 | 24 | 24 |
| Cache Memory | 26 | 26 | 26 | 26 |
| (Log Domain) | $Re(\log W_M^{mq})$ | $-Im(\log W_M^{mq})$ | $Im(\log W_M^{mq})$ | $Re(\log W_M^{mq})$ |
| (Log Domain) | $-Im(\log W_M^{mq})$ | $-Re(\log W_M^{mq})$ | $Re\,Im(\log W_M^{mq})$ | $-Im(\log W_M^{mq})$ |
| (Log Domain) | $Re(\log W_N^{lq})$ | $Im(\log W_N^{lq})$ | $Re(\log W_N^{lq})$ | $Im(\log W_N^{lq})$ |
| | | | | |
| Signal Value | $\log x_i$ | $\log x_i$ | $\log x_i$ | $\log x_i$ |

FIG. 4

SIGNAL PROCESSOR AND METHOD FOR FOURIER TRANSFORMATION

RELATED INVENTIONS

The present invention is related to the commonly assigned U.S. applications:

[1] "Computer processor having a pipelined architecture and method of using same", having Ser. No. 08/520,666 filed on Aug. 28, 1995;

[2] "Computer processor utilizing logarithmic conversion and method of use thereof", having Ser. No. 08/430,158 filed on Mar. 13, 1995;

[3] "Method and system for performing a convolution operation", having Ser. No. 08/535,800 filed on Sep. 28, 1995;

[4] "Logarithm/inverse logarithm converter and method of using same", having Ser. No. 08/381,368 filed on Jan. 31, 1995;

[5] "Computer processor having a pipelined architecture which utilizes feedback and method of using same", having Ser. No. 08/520,145 filed on Aug. 28, 1995.

The subject matter of the above—identified related inventions is hereby incorporated by reference into the disclosure of this invention.

FIELD OF THE INVENTION

The present invention relates generally to digital signal processing and, in particular, to signal processor and method for Fourier Transformation using a parallel architecture.

BACKGROUND OF THE INVENTION

In the electronic arts it is often desired to perform a Discrete Fourier Transformation (DFT) of an input signal. Such DFT operation usually requires performing matrix multiplications of large matrixes. Based on the DFT properties, there are many Fast Fourier Transformation (FFT) algorithms, as described in "Digital signal processing" by John G. Proakis and Dimitris G. Manolakis, 3rd edition, Prentice-Hall 1996. These algorithms use symmetry properties of transformation coefficients to reduce the size of the matrices to multiply at the expense of a larger number of matrix multiplications.

The general DFT is illustrated as follows. In the N-point DFT operation of an input signal $\{x(i), 0 \leq i \leq N\}$ with a number N of input data points, the DFT equation is:

$$X(k) = \sum_{i=0}^{N-1} x(i) e^{-j\frac{2\pi i k}{N}}, k = 0, 1, 2, \ldots N-1.$$

If the N can be factored as a product of two integers, that is: N=LM, then the above DFT equation can be rewritten as:

$$X(p,q) = \sum_{m=0}^{M-1} \sum_{l=0}^{L-1} x(l,m) W_N^{(Mp+q)(mL+l)}$$

with the elements $$W_C^{ab} = e^{-j\frac{2\pi ab}{C}}.$$

But with $W_N^{(Mp+q)(mL+l)} = W_N^{MLmP} W_N^{mLq} W_N^{Mpl} W_N^{lp}$ it becomes, $W_N^{MLmP}=1$, $W_N^{mLq}=W_M^{mq}$, $W_N^{Mpl}=W_L^{pl}$, so that the DFT can be simplified as:

$$X(p,q) = \sum_{l=0}^{L-1} \left\{ W_N^{lq} \left[ \sum_{m=0}^{M-1} x(l,m) W_M^{mq} \right] \right\} W_L^{lp}.$$

The above equation can be executed as three steps:

1. First step, compute the (L×M)(M×M) matrix operation:

$$F(l,q) = \sum_{m=0}^{M-1} x(l,m) W_M^{mq}, 0 \leq q \leq M-1, 0 \leq l \leq L-1.$$

2. The second step, compute the scale vector:

$$G(l,q) = W_N^{lq} F(l,q), 0 \leq q \leq M-1, 0 \leq l \leq L-1.$$

3. The third step, compute the (M×L)(L×L) matrix operation:

$$X(p,q) = \sum_{l=0}^{L-1} G(l,q) W_L^{lp}, 0 \leq q \leq M-1, 0 \leq p \leq L-1.$$

According to the state of the art, these steps are performed on a computer with a single central processing unit (CPU) which computes the sums of products one after the other. It fetches the data it needs for computing the actual product by direct memory access (DMA). Then it computes the actual product by normal floating point multiplication.

If in this general DFT the ordering of data is taken into account, the following scheme, called "Flying DFT", is applied:

(a) reorder the input signal elements x(i) in a matrix $x(l,m), 0 \leq l \leq L-1, 0 \leq m \leq M<1$, according to the factors L and M, i.e. store the signal column-wise, (b) perform the M-point DFT of each row, i.e. multiply L rows of the matrix x(l,m) by the appropriate transformation matrix W:

$$F(l,q) = \sum_{m=0}^{M-1} x(l,m) W_M^{mq}, 0 \leq q \leq M-1, 0 \leq l \leq L-1,$$

(c) scalar multiply the resulting array by phase factors $W_N^{lq}$:

$$G(l,q) = W_N^{lq} F(l,q), 0 \leq q \leq M-1, 0 \leq l \leq L-1,$$

(d) perform the L-point DFT of each column, i.e. multiply M columns of the matrix G(l,q) by the appropriate transformation matrix W:

$$X(p,q) = \sum_{l=0}^{L-1} G(l,q) W_L^{lp}, 0 \leq q \leq M-1, 0 \leq p \leq L-1,$$

(e) reorder the resulting array X(p,q), i.e. read the resulting array row-wise.

In all these transformations the matrices $W_C$ contain the elements $$W_C^{ab} = e^{-j\frac{2\pi ab}{C}}.$$

Because steps (b) and (d) contain complete DFTs, both steps may be replaced recursively by the whole scheme.

FIG. 1 shows this general DFT scheme according to the prior art in a schematic diagram for a 15-point DFT. The input signal $\{x(i), 0 \leq i \leq 15\}$ has a number 15 of input data points, where 15 is a product of 5 and 3. In step (a) the input signal elements x(i) are stored column-wise in a 5*3 matrix $x(l,m), 0 \leq l \leq 5-1, 0 \leq m \leq 3-1$. In step (b) are performed 3-point DFTs of each of the 5 rows. The resulting array is scalar multiplied in step (c) by phase factors $W_{15}^{lq}$. In step (d) 5-point DFTs of each column are performed and finally in step (e) the resulting array X(p,q) is read out row-wise as the output signal $\{X(k), 0 \leq k \leq 15\}$.

Consequently in the prior art, efficient FFT operation is based on a decimation to as small matrices as possible. This leads to butterfly computation where a signal consists of $2^N$ data points and computation is dissolved into $n = \log_2 N$ stages of decimation, each stage involves N/2 basic multiplications of a two-element vector with a 2×2 matrix, the so-called butterflies. This reduces the number of floating-point multiplications largely in order to make most efficient use of single processor computers. The FFT operation requires a butterfly data path, i.e. between two decimation stages the elements of the output vectors of the last stage are regrouped to form the input vectors of the next stage. This is inconvenient to implement in a signal processor with a parallel processor architecture.

There is a need to perform fast DFT on a signal processor.

There is a need to perform fast DFT in cases where the number of data points of the input signal is not a power of two.

There is a need to perform fast DFT on a signal processor with a parallel processor architecture.

BRIEF DESCRIPTION OF THE DRAWINGS

FIGS. 3-4 show the coefficients in the cache memory.

DETAILED DESCRIPTION OF THE PREFERRED EMBODIMENT

Generally, the present invention provides a signal processor that receives an input signal and, in turn, generates an output signal. The input and output signals are typically construed of digital words that represent numerical data.

An advantage of the present invention is that it provides a signal processor that is capable of performing sophisticated mathematical operations at high processing speeds. Another advantage of the present invention is that it provides a signal processor that has a high data throughput rate. A further advantage of the present invention is that it provides a signal processor that is efficiently implemented on a microchip, and is consequently small and consumes relatively little power.

Figure 2:
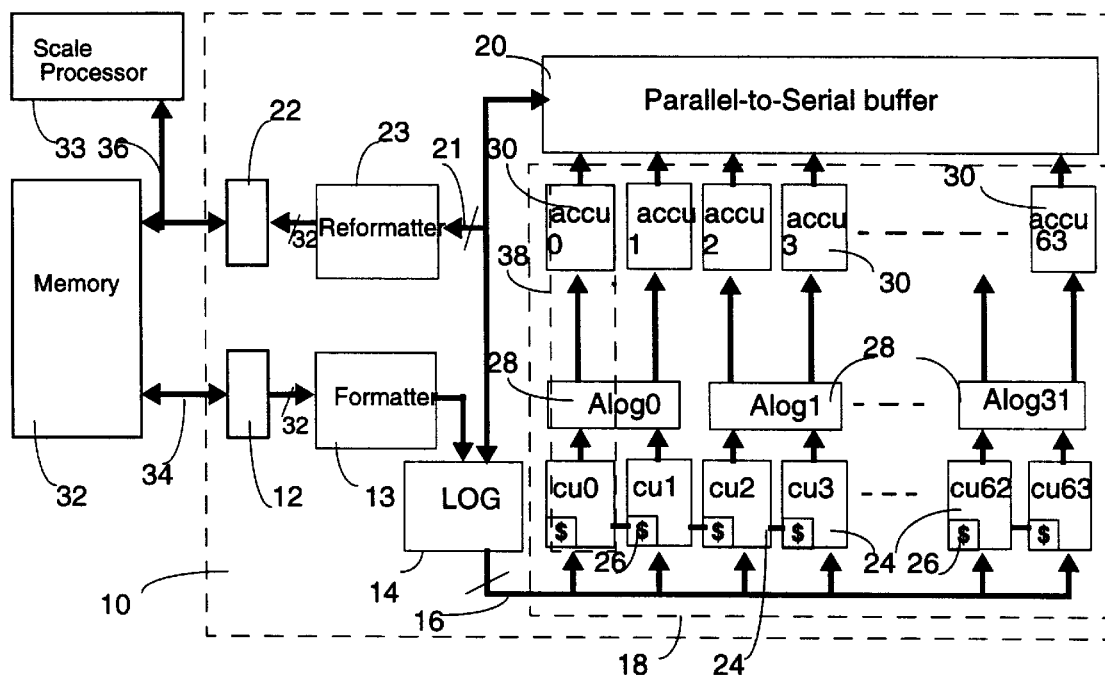
FIG. 2 is a simplified schematic diagram of a signal processor according to the present invention.

FIG. 2 illustrates a signal processor in accordance with a preferred embodiment of the present invention. Signal processor 10 comprises data input port 12, formatter 13, logarithmic converter LOG 14, data pipeline 16, computing unit 18, parallel-to-serial buffer 20, data out line 21, data output port 22 and reformatter 23. Computing unit 18 comprises a plurality of computing elements 24, cu0 . . . cu63, each having a cache memory 26. Computing unit 18 further comprises a plurality of inverse logarithmic converters 28, Alog0 . . . Alog31, and a plurality of accumulators 30, acu0 . . . acu63. The number H of computing elements 24 and also of accumulators 30 is in this embodiment H=64.

Signal processor 10 is connected to memory 32 and scale processor 33 by data buses 34, 36. Each computing element 24 has an associated accumulator 30 whereas two computing elements 24 share one associated inverse logarithmic converter 28. A computing element 24 and its associated accumulator 30 together with its associated inverse logarithmic converter 28 is referred to as processing element 38.

Signal processor 10 is used to provide an output signal that is a transformation of an input signal. The input signal $\{x(i), 0 \leq i \leq N\}$ consists of an ordered number N of input data points of real or complex values. Real values consist of one floating point data word each and complex values consist of two floating point data words each. Some or all processing elements 38 can compute in parallel and carry out the same instruction with the same input data but different data from their respective cache memory. Processing elements 38 compute pairwise one complex data point, one processing element 38 computes the real part and the other computes the imaginary part.

The number N of input data points is known in advance and determines the complexity of the transformation calculation. In general, the result of the transformation will be an output signal $\{X(i), 0 \leq k \leq N\}$ with the same number of data points as the input signal. But there are situations where not all formally existing output signal data points are needed and therefore a smaller output signal $\{X(i), 0 \leq k \leq N'\}$ with $N' \leq N$ is calculated.

For simplicity, the operation of signal processor 10 will be described now with a "small" signal with $N \leq H/2$. Then, the input signal points are fed serially to signal processor 10 and each processing element 38 computes one output signal point, with H computing elements 38 acting in parallel. This example explains how the signal processor according to the invention computes transformations in parallel. This example also explains how the signal processor according to the invention computes multiplications in the logarithmic domain.

Basically, the transformation contains a number of sums of products of complex multiplications. Thus, a large number of signal data points are multiplied with a number of coefficients. In this example pairs of two processing elements compute one complex output signal data point, i.e. one processing element computes the real part, the other computes the imaginary part of the output signal data point. Therefore, each processing element computes only real multiplications that are summed up. The invention makes use of the fact, that several products contain the same factors. On one hand, several sums can be computed in parallel. On the other hand, the multiplication can be done in the logarithmic domain. This example uses both to the additional advantage, that the logarithmic conversion of each factor happens only once, even if the factor appears in different products.

The following scheme applies: The coefficients are converted once to their logarithm and stored in a cache memory. The input data is converted serially to its logarithm, and fed to all processing units in parallel. The processing units compute their respective products as additions in the logarithmic domain. Then, the products are converted back to the normal domain. This conversion takes care of the signs of the factors in the normal domain which have bypassed the logarithmic domain. The products with the correct sign are summed by the accumulator of the respective processing element. After the last signal data point has run through the processing elements and the last products are added to their respective sums, all complex output signal data points are complete simultaneously and transferred to the parallel-to-serial buffer to be read out via the data output port.

Now, the scheme is explained in detail: The required DFT transformation is $$X(k) = \sum_{i=0}^{N-1} x(i) W_N^k, k = 0, 1, 2, \ldots N-1. \quad (1)$$

with the transformation factors $$W_N^k = e^{-j\frac{2\pi k}{N}}.$$

Operation of signal processor 10 begins with storing both the sign and the logarithms of the absolute values of the transformation factors $W_N^k$ in cache memories 26 of processing elements 38. One complex factor is stored in each processing element, for each processing element is associated to one value of k.

The input signal that is to be transformed can be stored in memory 32 or come directly to the signal processor. The input signal enters signal processor 10 via data input port 12, one floating point data word per clock cycle, one complex data point per two clock cycles. Formatter 13 reformats the input signal to a data format that is easy to convert to logarithmic form. This step is only necessary in cases where the signal processor 10 uses a different data format than that of the input signal. Each floating point data word's absolute value is converted to its logarithm equivalent by logarithmic converter 14. This can be done by calculation or using a look-up table or using a combination thereof. The sign of the floating point data word is handled separately and passes directly to inverse logarithmic converters 28. The connection between LOG unit 14 and Alog units 28 over which the sign information passes has been omitted for simplicity of illustration.

The logarithm input signal data are then given into data pipeline 16, one word per clock cycle, one complex data point per two clock cycles. Data pipeline 16 feeds the logarithm input signal data in parallel to all N active computing elements 24 of computing unit 18. There, each computing element 24 adds the appropriate logarithmic coefficient value from its cache memory 26 to provide log sum data. Then, each log sum data is inversely logarithmic converted by inverse logarithmic converters 28. Each result is product data in the normal domain. The sign of such product data is calculated from the signs of each product's factors which have bypassed the logarithmic domain. The product data is then transferred to accumulator 30 of its processing element 38. Each accumulator 30 sums one product each clock cycle.

In this example the input signal is complex and contains N real signal words and N imaginary signal words. Processing elements 38 compute pairwise one complex data point; one processing element 38 computes the real part, and the other computes the imaginary part. Both include two real multiplications that add to the sum per input data point. That means, 2N sums containing 2N products each are calculated in parallel over 2N processor clock cycles. Then, all 2N sums are completed simultaneously which represent N complex output signal points. These sums are transferred to parallel-to-serial buffer 20 to form the output signal. Parallel-to-serial buffer 20 receives several data values in parallel simultaneously and outputs them in sequentially upon a parallel bus, namely data out line 21. The output signal is successively transferred via data out line 21 to reformatter 23, where it is reformatted to the same data format as the input signal. Then, the output signal is read serially from the signal processor via data output port 22. Note that in this example only one complex logarithm transformation factor plus its signs in the normal domain have to be stored in each cache memory.

Now, the operation of signal processor 10 will be described with a "large" signal with $N \leq H/2$, where N is a prime or non-prime number $N=h*H/2+h'$ and H is the number of parallel computing elements. Prime numbers are the most unsymmetric cases and cannot be simplified as the non-prime cases described below. Again, 2N sums containing 2N products each have to be calculated, but only H/2 output signal points may be calculated in parallel. Thus, in h turns H/2 output signal points are calculated in each turn and the remaining h ' output signal points are calculated in another turn. Note that in this example only one complex logarithm transformation factor plus its signs in the normal domain have to be stored in each's processing element's cache memory in each turn according to the values of k to be computed in that turn. In this case it is useful to store the input signal and the output signal in a memory. The complete input signal is first stored in memory 32 and then read out of memory 32 and run through signal processor 10 in each of the h+1 turns. The calculated output signal points are stored in memory 32 after each turn so that after h+1 turns the complete output signal is available in memory 32.

The sign informations associated with the normal domain data values and normal domain coefficients are not used in the logarithmic processing but send to Alog units 28 to be recombined when the log sum values are converted back to the normal domain product values. In the preferred implementation sign informations about, for example, the coefficients can be stored in the cache memories so as to simplify having the sign information arrive at the Alogs at the proper time but this is not essential. Any means of temporary storing the sign information can be used.

This example shows the advantage of the present invention over the prior art in cases with a "large" signal, but there are still very many (about $2N*N/(H/2)=4N^2/H$) clock cycles needed to do the whole transformation.

The operation of signal processor 10 is described with a "large" signal with $N \leq H/2$, where N is a non-prime number N=LM. One can use symmetry properties in the transformation factors to decimate the transformation of the "large" input signal in smaller intermediate transformations. So, one N-point transformation is decimated into L M-point transformations and M L-point transformations and some scaling multiplications. These intermediate transformations can be carried out as independent transformations which transform a signal containing signal points into a transform containing transform points. This is to distinguish the intermediate transformations from the overall transformation of the input signal into the output signal. This decimation can be done recursively up to at most the total number of prime factors, into which N can be dissected.

With the powerful signal processor 10 of FIG. 2 with H processing elements 38 working H/2 transform points in parallel, efficient use of signal processor 10 is made when as many calculations are done in parallel as possible. For example, with the powerful signal processor 10 of FIG. 2 with H=64 processing elements working H/2=32 transform points in parallel, a N=840-point transformation can be decimated in L*M=28*30, i.e. L=28 M=30-point transformations and M=30 L=28-point transformations, regardless of the prime factors dissection 840=2*2*2*3*5*7.

Figure 1:
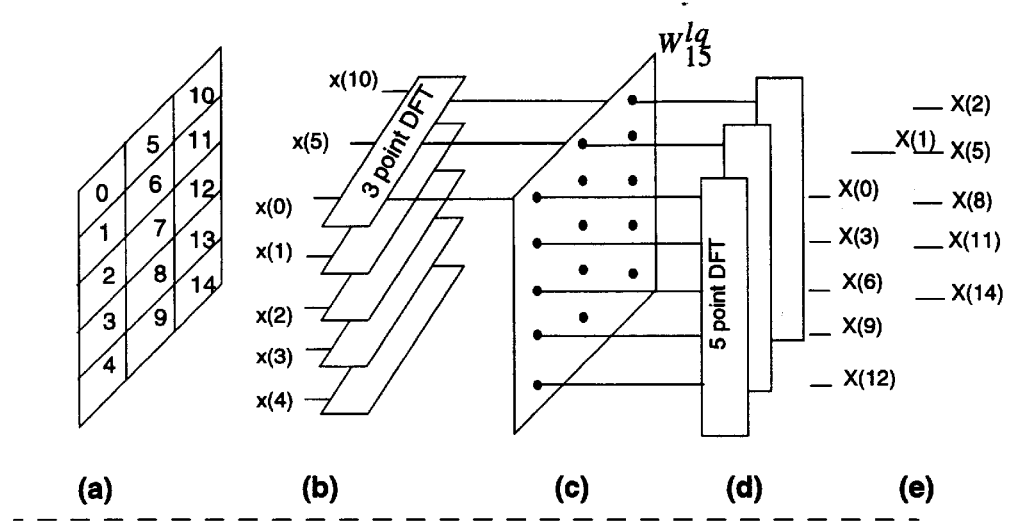
FIG. 1 is a simplified schematic diagram of the general DFT scheme according to the prior art.

Now, this case N=840, LM=28*30, is described as an example, with the signal processor of FIG. 2, wherein the "Flying DFT" scheme of FIG. 1 with steps (a) to (e) is applied, but with LM=28*30 instead of LM=5*3 as before in FIG. 1. The input signal x(i) is stored in memory 32. As before, transformation matrices $W_C$ contain the elements $$W_C^{ab} = e^{-j\frac{2\pi ab}{C}}.$$

Step (a) reorder the input signal elements x(i) in a matrix x(l,m), $0 \leq l \leq L-1$, $0 \leq m \leq M-1$, according to the factors L and M, i.e. store the signal column-wise, can be carried out by storing the input signal elements x(i) in an appropriate nonsequential order in memory 32 and read the elements in sequence therefrom. Step (a) also can be carried out by storing the input signal elements x(i) in sequence in memory 32 and reading the elements in an appropriate nonsequential order therefrom. In both ways, the input signal is stored column-wise in a matrix x(l,m) in the sense of this description. Now, each row of the matrix x(l,m) contains M elements and an M-point DFT is to be performed on each row according to step (b) perform the M-point DFT of each row, i.e. multiply L rows of the matrix x(l,m) by the appropriate transformation matrix W:

$$F(l,q) = \sum_{m=0}^{M-1} x(l,m) W_M^{mq}, 0 \leq q \leq M-1, 0 \leq l \leq L-1. \tag{2}$$

Because $M \leq H/2$, the sums for all M values of q are carried out simultaneously similar to the "simple" case described above, but with slightly different transformation coefficients $W_M^{mq}$, which now also depend on the summation index m. Thus, instead of one coefficient, now M coefficients are calculated and their logarithms and signs are stored in cache memory 26 of each processing element 38. Two processing elements 38 compute one complex transform point as they did in the "simple" case.

The L rows of the matrix x(l,m) are now treated each as one signal. These signals are processed by signal processor 10 one after the other in the same way. Even the transformation coefficients are the same so that the cache memory has only to be filled once. After each signal/row one signal is produced by signal processor 10 and stored in memory 32. The processing of one signal/row is described now. Because of the similarities with the "simple" case described above the details will be omitted here.

The signal enters signal processor 10 via data input port 12, one floating point data word per clock cycle, one complex data point per two clock cycles. Formatter 13 reformats the input signal to a data format that is easy to convert to logarithmic form. Each floating point data word's absolute value is converted to its logarithm input signal data by logarithmic converter 14. The sign of the floating point data word is handled separately and passes directly to the inverse logarithmic converters 28. The logarithm input signal data is then loaded into data pipeline 16, one word per clock cycle, one complex data point per two clock cycles. Data pipeline 16 feeds the logarithm input signal data in parallel to all 2M=H active computing elements 24 of computing unit 18. There, each computing element 24 adds the appropriate logarithmic coefficient value from its cache memory 26 to provide a log sum data. Then, each log sum data is inversely logarithmic converted by inverse logarithmic converters 28, each result is product data in the normal domain. The sign of such product data is calculated from the signs of each product's factors which have bypassed the logarithmic domain. Each product data is then transferred to accumulator 30 of its processing element 38. Each accumulator 30 sums one product each clock cycle. The input signal is complex and contains M real signal words and M imaginary signal words. Processing elements 38 compute pairwise one complex data point, one processing element 38 computes the real part, and the other computes the imaginary part. Both include two real multiplications that add to the sum per input data point. That means, 2M sums containing 2M products each are calculated in parallel over 2M processor clock cycles. Then, all 2M sums are complete simultaneously which represent M complex transform signal points. These sums are transferred to parallel-to-serial buffer 20 to form the transform signal. The transform signal is successively transferred via data out line 21 to reformatter 23, where it is, conveniently, reformatted to the same data format as the input signal. Then, the transform signal is read serially from the signal processor via data output port 22 and is written to memory 32. After this procedure has been carried out for all rows, the resulting array F(l,q), $0 \leq q \leq M-1$, $0 \leq l \leq L-1$ is stored in memory 32.

Now, according to step (c) scalar multiply the resulting array by phase factors $W_N^{lq}$:

$$G(l,q) = W_N^{lq} F(l,q), 0 \leq q \leq M-1, 0 \leq l \leq L-1, \tag{3}$$

each complex array element is multiplicated by a complex scalar factor $W_N^{lq}$. This is done by a scaling means, either by external scale processor 33 or by computing unit 18. The elements of resulting array F(l,q) of step (b) are typically produced in a different order than the elements G(l,q) will enter step (d), if one thinks in a scheme of matrix operations with "rows" and "columns". As known to those of skill in the art, data can be stored in and read out from memory 32 in different orders. Therefore, it is easy to meet the ordering requirements between steps (b) and (d) by DMA, i.e. writing to/reading from memory 32 in the right order. The scalar multiplication of step (c) has regard to this order, even allows a reordering within step (c), i.e. switching the indices during the scalar multiplication by reading the elements F(l,q) in one order and writing the elements G(l,q) in a different order. Thus, it is easy to meet the ordering requirements for step (d) perform the L-point DFT of each column, e.g. multiply M columns of the matrix G(l,q) by the appropriate transformation matrix W:

$$X(p,q) = \sum_{l=0}^{L-1} G(l,q) W_L^{lp}, 0 \leq q \leq M-1, 0 \leq p \leq L-1 \tag{4}$$

One can store G(l,q) in columns and read out by rows, or vice-versa, so as to meet the index order for Eq. (4). The columns of the G(l,q) matrix are the intermediate signals produced by step (c) that are transformed by signal processor 10 in the same way as in step (b), only with adjusted indices and therefore new transformation coefficients. The result is array X(p,q) stored in memory 32. Array X(p,q) already contains the output signal elements, which are put in the right order according to step (e) reorder the resulting array X(p,q), i.e. read the resulting array row-wise.

Again, data can be stored in and read out from memory 32 in different orders, so hat step (e) can be met either by storing the elements X(p,q) not in sequence but directly in the right order or storing them in sequence and reading them out in the right order. In either case, the result is output signal X(k) which is available in the memory.

Because steps (b) and (d) contain complete DFTs, both steps may be replaced recursively by the whole scheme. Then, the transformation coefficients have to be adjusted. For example, if N=LMP, this one N-point transformation can be decimated in L*M P-point transformations, L*P M-point transformations and M*P L-point transformations, with the appropriate phase factors.

Very efficient use of signal processor 10 of FIG. 2 with H=64 processing elements working H/2=32 transform points in parallel, is made when all processing elements are active in all intermediate transformations, i.e. N=1024, LM=32*32 and higher powers of H/2=32. If M is set to equal to L=32(32×32=1024-point DFT), then all coefficients in step (b) and in step (d) are same and need be stored only once in the cache memory. Preferably, the output result F of step (b) is sent to scale processor 33 for the coefficient multiplication, step (c), one by one and the result G put back in the memory. This step (c) can be pipelined with the step (b). Step (d) is to run G through signal processor 10 to do matrix operation to get the final result X. The advantages of using this method are: (1) Coefficient data is only loaded once if $W_L^{lp}=W_M^{mq}$. (2) Scale processor 33 can do the scale multiplication very easily and it can send the transposed data back to signal processor 10. (3) The timing can be overlapped between the first step and second step.

In the forgoing, it is generally assumed that the input signal contains complex values. In the cases of a real input signal, i.e. where the imaginary parts of the input signal points are zero, these therefore do not contribute to the summation. In these cases, only real values are fed to signal processor 10 and the first summation is twice as fast. The coefficients are still complex and so is the result after step (b). Here also two processing elements compute one complex transformation point.

A further embodiment of the present invention is in general like the one described above and shown in FIG. 2, but has the additional feature, that computing elements 24 are capable of two additions in the logarithmic domain, i.e. computing elements 24 add two values from their respective cache memory to the input data which arrive from logarithmic converter 14. This means, computing elements 24 can generate products of three factors in the normal domain. This makes it possible to carry out steps (b) and (c) of the method described above simultaneously. The factors $W_N^{lq}$ contain the index q of the respective computing element and the index l of the signal/row, but are the same for a complete summation by accumulators 30. Therefore, the factors $W_N^{lq}$ can be stored in the cache memory 26 with respect to each computing element 38. The result of accumulators 30 is then $$G(l, q) = \sum_{m=0}^{M-1} W_N^{lq} x(l, m) W_M^{mq}, 0 \leq q \leq M-1, 0 \leq l \leq L-1.$$

Preferably, the two additions in the logarithmic domain are computed in one processor clock cycle. Carrying out the two additions in the logarithmic domain can be done by four computing elements 38 per complex transform point. In this case one accumulator 30 sums over two computing elements 38 each for the real and the imaginary part of one complex transform point. The signs of the normal domain values are handled as described above in order to bypass the logarithmic addition. Signs in FIG. 3 and FIG. 4 are understood in this way, which are described now.

FIG. 3 shows schematically how the real and imaginary parts of the coefficients in cache memory 26 can be distributed over four processing elements 38 that compute one transform point in the case of a real input signal. The real value log $x_i$ is fed in parallel to all four computing elements 38. Appropriate real and imaginary parts log $W_M^{mq}$ and log $W_N^{lq}$ are added to the real value log $x_i$. The result, is inverse logarithmic converted and summed in the normal domain by accumulator 30.

FIG. 4 shows schematically how the real and imaginary parts of the coefficients in the cache memory can be distributed over four processing elements 38 that compute one transform point in the case of a complex input signal. In this embodiment cache memory 26 is associated to the computing elements 38 individually so that one computing element 38 has no access to cache memory 26 of a different computing element 38. Therefore, one of the coefficients, in this example Log $W_m^{mq}$, is stored with its real and imaginary parts in cache memory 26 of each computing element 38. The real and imaginary parts log $x_i$ are fed successively in parallel to all four computing elements 38. Appropriate real and imaginary parts log $W_M^{mq}$ and log $W_N^{lq}$ are added to real and imaginary parts log $x_i$. The result, is inverse logarithmic converted and summed in the normal domain by accumulator 30.

Very efficient use of this signal processor 10 of FIG. 2 with H=64 processing elements working H/4=16 transform points in parallel, is made when all processing elements are active in all intermediate transformations, i.e. N=256, LM=16*16 and higher powers of H/4=16. If M is set to equal to L=16(16*16=256-point DFT), then all coefficients in step (b) and in step (d) are same and must be stored only once in the cache memory. The input data is fed to signal processor 10 to do the matrix operation with the steps (b) and (c) coefficients. The output G is loaded again to signal processor 10 to do the matrix operation with step (d) coefficients. The advantages of using this method are: (1) The coefficient data is only loaded once if $W_L^{lp}=W_M^{mq}$. (2) The flying DFT is done without a scale processor.

Based on the description herein those skilled in the art will understand the advantages of the described embodiments. From their skill they know that the described elements and steps may be combined differently. For example, they can combine several signal processors in parallel or to build a pipeline of two or more signal processors in series. They can connect the scale processor differently. They can build a signal processor with a different number of computing elements or with a cache memory which several computing elements can use in common. Connecting multiple computing units for computing in parallel allows one to compute in parallel for all q or all l the (L'×M')(M'×M') matrix operation:

$$F(l,q) = \sum_{m=0}^{M'-1} x(l,m) W_{M'}^{mq}, 0 \le q \le M'-1, 0 \le l \le L-1,$$

where N'=M'*L' is greater than N=M*L.

More important, based on the description herein, those skilled in the art will also know that matrix operations can be performed on a parallel processor in different ways, in that, for example, rows and columns are only a mathematical ordering scheme. Therefore, matrices can be exchanged and reindexed so that, for example, the signal is stored in the cache memory and the coefficients run through the processor. Further, the same sums/output signal elements can be stored in the same memory positions as described.

In the foregoing detailed description of the preferred embodiment, reference is made to the accompanying drawings which form a part hereof, and in which are shown by way of illustration specific embodiments in which the invention can be practiced. These embodiments have been described in sufficient detail to enable those skilled in the art to practice the invention, and it is to be understood that other embodiments can be utilized and that logical,mechanical and electrical changes may be made without departing from the spirit and scope of the present invention. The foregoing detailed description is, therefore, not to be taken in a limiting sense, and the scope of the present inventions is defined only by the appended claims.

We claim:

1. A method for performing a discrete Fourier Transformation of an input signal $\{x(i), 0 \le i \le N\}$ of a number N of input data values, N being the product of the factors L and M, on a computer processor having a memory and a computing unit with several computing elements, that are able to compute in parallel, to produce an output signal, which method comprises the steps of:

(a) reordering the input signal elements x(i) in a matrix x(l,m), $0 \le l \le L-1$, $0 \le m \le M-1$, according to the factors L and M;

(b) converting the input signals to a logarithmic domain;

(c) computing in parallel for all q or all l an (L×M)(M×M) matrix operation:

$$F(l,q) = \sum_{m=0}^{M-1} x(l,m) W_M^{mq}, 0 \le q \le M-1, 0 \le l \le L-1;$$

(d) computing the scale vector:

$$G(l,q) = W_N^{lq} F(l,q), 0 \le q \le M-1, 0 \le l \le L-1;$$

(e) computing the (M×L)(L×L) matrix operation:

$$X(p,q) = \sum_{l=0}^{L-1} G(l,q) W_L^{lp}, 0 \le q \le M-1, 0 \le p \le L-1; \text{ and}$$

(f) converting the results of the matrix operation to inverse log signals,
wherein matrices W contain elements $$W_C^{ab} = e^{-j\frac{2\pi ab}{C}}$$

and X(p,q) contains the elements of the Fourier Transform X(k) of the input signal x(i).

2. The method of claim 1, comprising the additional step (e) reordering X(p,q) to yield the Fourier Transform X(k) of the input signal x(i).

3. The method of claim 1, wherein step (c) is computed in parallel for all q or for all l.

4. The method of claim 1, wherein step (d) is computed in parallel for all q or for all l.

5. The method of claim 1, wherein steps (b) and (c) are computed in parallel for all q in one computing unit clock cycle.

6. The method of claim 1, wherein step (c) is computed by a scale processor.

7. The method of claim 1, with an additional matrix transposing step before or after step (c).

8. The method of claim 7, wherein the additional matrix transposing step is performed by external DMA.

9. The method of claim 1, performed on a computer processor having computing elements with a cache memory, wherein matrix elements are stored in this cache memory.

10. The method of claim 9, wherein the matrix elements $W_M^{mq}$, $W_N^{lq}$, and $W_L^{lp}$ are stored in the cache memory.

11. The method of claim 9, wherein the computed matrix elements G(l,q) of step (c) are stored in the cache memory.

12. The method of claim 1, wherein the signal processor comprises more than one computing units with several computing elements each that are able to compute in parallel.

13. The method of claim 12, wherein steps (b) and (d) are performed on different computing units.

14. The method of claim 13, wherein the computed matrix elements of step (d) are stored in the cache memory.

15. The method of claim 1, wherein step (d) is treated as a set of M separate L-point Fourier Transformations and the method is recursively applied in that old step (d) is replaced by new steps (a') to (d') with L=N' and for each q $$\{G(l,q), 0 \le l \le L-1\} = \{x'(i'), 0 \le i' \le N'\}.$$

16. The method of claim 15, wherein the recursion is repeated.

17. The method of claim 1, wherein $L=M=\sqrt{N}$ and the number of computing elements is equal to $2\sqrt{N}$.

18. The method of claim 1, wherein $L=M=\sqrt{N}$ and the number of computing elements is equal to $4\sqrt{N}$.

19. A signal processor comprising:

a memory for storing an input signal $\{x(i), 0 \le i \le N\}$ of a number N of input data values, N being the product of the factors L and M, in a matrix $x(l,m), 0 \le l \le L-1, 0 \le m \le M-1$, according to the factors L and M;

a log converter to perform logarithmic conversion on the input data values;

a computing unit response to the log converter and having several processing elements for computing in parallel for all q or all l an (L×M)(M×M) matrix operation:

$$F(l, q) = \sum_{m=0}^{M-1} x(l, m) W_M^{mq}, 0 \le q \le M - 1, 0 \le l \le L - 1;$$

and scaling means coupled to the memory for computing the scale operation:

$$G(l,q) = W_N^{lq} F(l,q), 0 \le q \le M-1, 0 \le l \le L-1;$$

an inverse log converter response to the scaling means to perform inverse-logarithmic conversions,
wherein matrices W contain elements $$W_C^{ab} = e^{-j\frac{2\pi ab}{C}},$$

take on parameter values indicated in the equations.

20. The signal processor of claim 19, wherein the memory receives and stores the elements G(l,q), and the elements of the (M×L)(L×L) matrix operation:

$$X(p, q) = \sum_{l=0}^{L-1} G(l, q) W_L^{lp}, 0 \le q \le M - 1, 0 \le p \le L - 1,$$

which are computed by the computing unit.

21. The signal processor of claim 19, wherein each processing element has a computing element for performing multiplications on input data points.

22. The signal processor of claim 19, wherein each computing element is adapted to perform multiplications as additions in the logarithmic domain.

23. The signal processor of claim 19, wherein each processing element has an accumulator for summing data.

24. The signal processor of claim 19, comprising a second memory connected to the computing unit to receive and store the elements G(l,q), and a second computing unit for performing the (M×L)(L×L) matrix operation:

$$X(p, q) = \sum_{l=0}^{L-1} G(l, q) W_L^{lp}, 0 \le q \le M - 1, 0 \le p \le L - 1.$$

25. The signal processor of claim 19, further comprising multiple computing units for computing in parallel for all q or all l the (L'×M')(M'×M') matrix operation:

$$F(l, q) = \sum_{m=0}^{M'-1} x(l, m) W_{M'}^{mq}, 0 \le q \le M' - 1, 0 \le l \le L - 1,$$

where N'=M'*L' is greater than N=M*L.

* * * * *

UNITED STATES PATENT AND TRADEMARK OFFICE
CERTIFICATE OF CORRECTION

PATENT NO. : 5,968,112
DATED :
INVENTOR(S) : Oct. 19, 1999
Kirschenbaum et al.

It is certified that error appears in the above-indentified patent and that said Letters Patent is hereby corrected as shown below:

Column 11, line 49 delete "1" and insert --*l*--

Column 13, line 7 before scaling insert --a--

Column 13, line 16 after "," insert --a,b,C--

Column 13, line 22 delete "1" and insert --*l*--

Signed and Sealed this

Twenty-fifth Day of July, 2000

Attest:

Q. TODD DICKINSON

Attesting Officer

Director of Patents and Trademarks